US006587454B1

(12) United States Patent
Lamb

(10) Patent No.: US 6,587,454 B1
(45) Date of Patent: Jul. 1, 2003

(54) NETWORK ADAPTOR FOR TELEPHONE AND DATA TRAFFIC

(75) Inventor: Christopher Hume Lamb, Weston, MA (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/086,103

(22) Filed: May 28, 1998

Related U.S. Application Data

(63) Continuation-in-part of application No. 08/865,015, filed on May 29, 1997.

(51) Int. Cl.[7] .......................... H04L 12/66; H04L 12/28
(52) U.S. Cl. ...................................... 370/352; 370/401
(58) Field of Search ................................ 370/352, 356, 370/395, 465, 466, 467, 469, 474, 485, 493; 379/93.09, 93.11, 93.14

(56) References Cited

U.S. PATENT DOCUMENTS

| | | | | |
|---|---|---|---|---|
| 4,740,955 A | * | 4/1988 | Litterer et al. ............... | 370/264 |
| 5,067,125 A | * | 11/1991 | Tsuchida ...................... | 370/79 |
| 5,633,920 A | | 5/1997 | Kikinis et al. | |
| 5,889,856 A | * | 3/1999 | O'Toole et al. .............. | 379/399 |
| 5,894,508 A | * | 4/1999 | Kim ....................... | 379/102.04 |
| 5,930,340 A | * | 7/1999 | Bell ......................... | 379/93.08 |
| 5,970,066 A | * | 10/1999 | Lowry et al. ................ | 370/353 |
| 5,991,292 A | * | 11/1999 | Focsaneanu et al. ........ | 370/352 |
| 6,049,531 A | * | 4/2000 | Roy ............................ | 370/260 |
| 6,049,826 A | * | 4/2000 | Beser .......................... | 709/222 |
| 6,128,293 A | * | 10/2000 | Pfeffer ........................ | 370/359 |
| 6,131,012 A | * | 10/2000 | Struhsaker et al. .......... | 455/5.1 |

* cited by examiner

*Primary Examiner*—Wellington Chin
*Assistant Examiner*—Brenda Pham
(74) *Attorney, Agent, or Firm*—McDonnell Boehnen Hulbert & Berghoff

(57) ABSTRACT

An adaptor supports supplying both telephone signals and data signals over a local area network medium such as a twisted pair wire for Ethernet. The adaptor can be incorporated into a telephone or a computer. The adaptor comprises a first packet port, second packet port and a telephone port. Core logic is coupled to the first and second packet ports and to the telephone port and retransmits network packets which are received on the first and second packet ports and on the telephone port to at least one other of the first and second packet ports and the telephone port. The data processing resources are coupled to the telephone port and to the core logic which translate network packets destined to the telephone port into telephone signals and to translate telephone signals destined to the core logic into network packets. This way, telephone data transmitted as network packets through a network are appropriately routed to the telephone and translated into standard telephone signals. Network packets which are destined to a network attached device other than the telephone are routed through the core logic into standard network protocols.

24 Claims, 7 Drawing Sheets

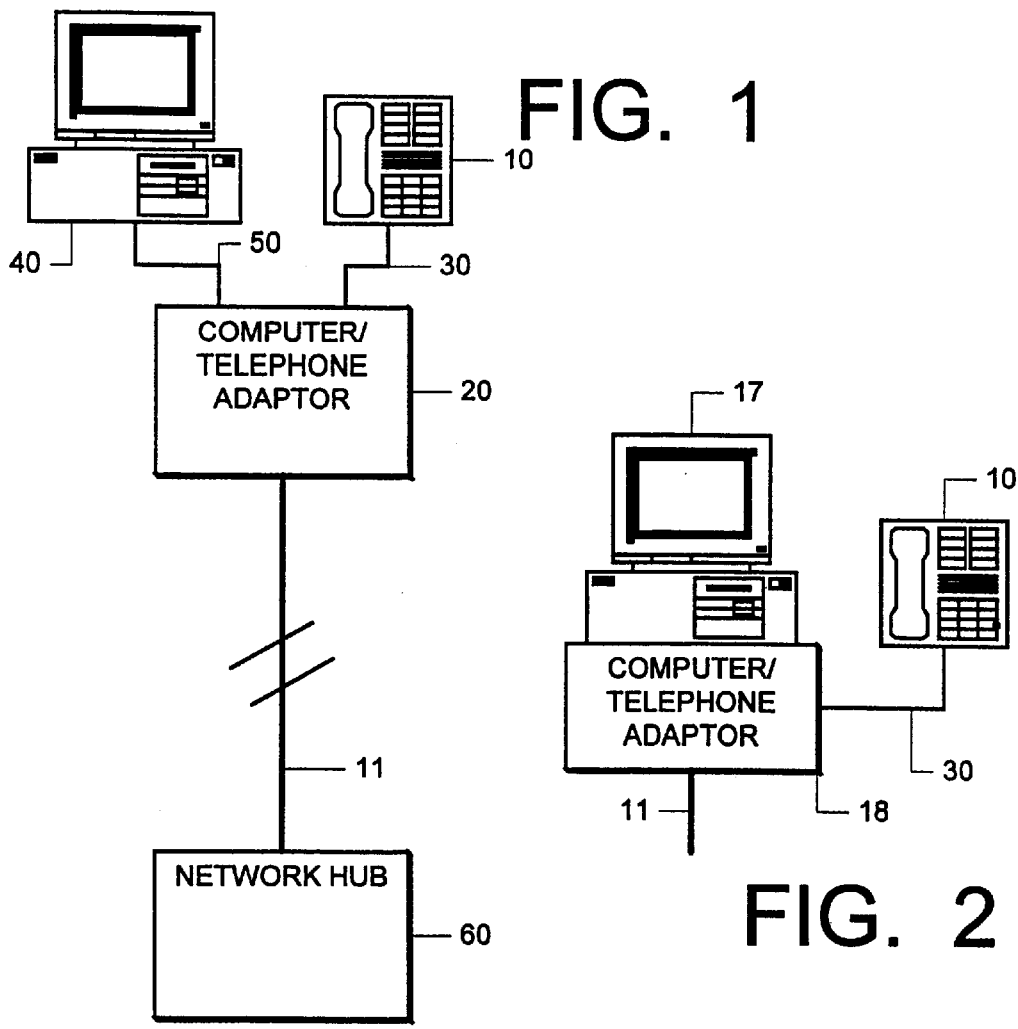
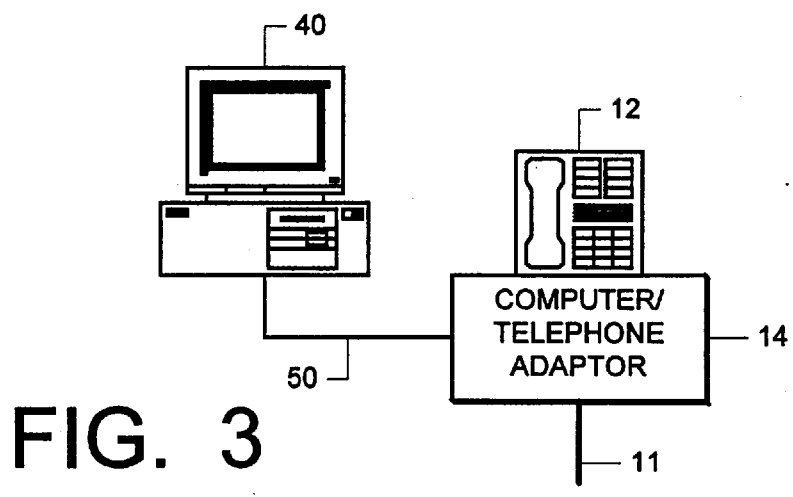

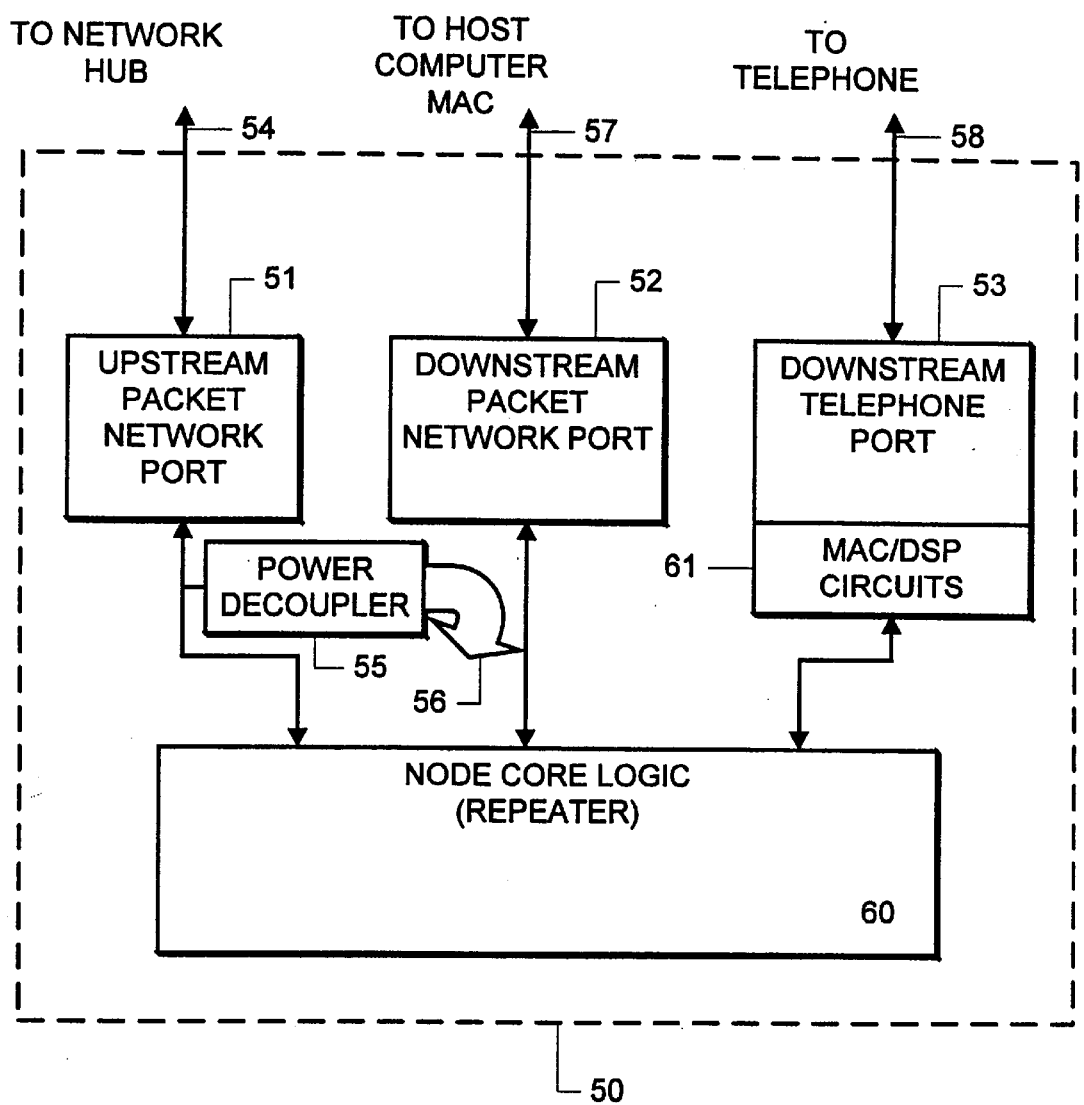

NETWORK ADAPTOR FOR TELEPHONE AND DATA TRAFFIC

RELATED APPLICATIONS

This application is a continuation-in-part of, and incorporates by reference, U.S. patent application Ser. No. 08/865,015, filed on May 29, 1997, entitled, "Power Transfer Apparatus for Use by Network Devices Including Telephone Equipment," having inventors Christopher Hume Lamb and Peter S. Wang, and being assigned to the assignee of the present application.

BACKGROUND OF THE INVENTION

1. Field of the Invention

The invention relates in general to the field of data networking and communications, and in particular to interconnecting computers to a local area network ("LAN") or a wide area network ("WAN") through data lines that carry power, network data and telephone data.

2. Description of Related Art

Packet networks (e.g. Ethernet) are used to connect computer systems. Various techniques exist for attaching devices to a computer network. Generally, attached devices are computer systems, but more recently other devices, such as telephones, are being attached to the computer network. Conventional telephones are analog devices designed to connect to circuit switched networks. The attachment of telephones to packet networks, and more particularly to local area networks (e.g. Ethernet) is a more recent phenomenon.

Network devices, such as networked personal computers, typically communicate via wired data lines and receive power from a separate line. For example, personal computers ("PCs") may communicate Ethernet signals via category three (CAT-3) or category five (CAT-5) twisted pair wire and receive power from a second cable connected to a power source, such as a wall socket or a battery. However, it is desirable to be able to eliminate the need for the second cable.

Plain old telephone service ("POTS") combines a voice signal with a power signal. The combined signal is transmitted over twisted pair cable between the telephone and the line card at the public telephone exchange office. The line card also supplies power over the two wires carrying the voice signal. However, the voice signal supported by POTS is not sufficient for bandwidth intensive communications needs, such as, Ethernet communications. Similarly, ISDN communications transmit power and digital data over between an ISDN modem and a telephone switch. However, ISDN data rates are more than an order of magnitude lower than Ethernet data rates.

Additionally, telephone systems using private bridge exchanges (PBXs) typically have a wired connection that is separate from the network devices. This additional wired connection carries both telephone data signals and power to the telephone. The telephone data signals may be either digital or analog data signals that carry the voice conversations to and from the PBX to a telephone. The PBX is responsible for relaying the voice conversation to and from other users or out into the public telephone exchange. The PBX also supplies the telephone with power. In the event of a power outage, the PBX may have a back up power supply to allow users to continue to use their phones during the power outage.

POTS does have one important feature which is supported by some PBX systems. During a power failure, the telephone continues to operate. This is because power is supplied to the telephone directly from a backup power system at the PBX or the central office switch. This is a desirable feature of telephone systems.

In previous systems where a user has both a network device and a telephone, the user will have a cable connected to the network for network communications with the network device, a cable connected to a power source for the powering the network device, and a cable connected to the PBX for powering and carrying communications to and from the telephone. One problem with such a system is the cost of installing and maintaining all of these cables. Therefore, it is desirable to have a system that supplies the same general network device and telephone functionality to the user, but reduces the significant cabling costs of the system.

Conventional telephone signals are analog and continuous. One approach to attaching these devices to packet switched networks is to incorporate circuitry enabling telephones to attach directly to a packet network. An unsatisfactory issue related to this problem is that the packet attached telephone requires duplicate wiring—even though both computers and telephones attach to the same packet network—because two physical connections are needed, one for the telephone and one for the computer. The duplicate wiring adds significant cost to the overall network installation. Therefore, what is needed is an apparatus that allows a telephone and computer to utilize the same wiring simultaneously.

Therefore, what is needed is a solution that reduces the wiring requirements to transmit data and power to a network device and a telephone without significantly reducing the functionality of the network device and the telephone.

SUMMARY OF THE INVENTION

The present invention provides an adaptor which supports supplying both telephone signals and data signals over a local area network medium such as a twisted pair wire for Ethernet. The adaptor according to one aspect of the invention comprises a first packet port, second packet port and a telephone port. Core logic is coupled to the first and second packet ports and to the telephone port and retransmits network packets which are received on the first and second packet ports and on the telephone port to at least one other of the first arid second packet ports and the telephone port. Data processing resources are coupled to the telephone port and to the core logic which translate network packets destined to the telephone port into telephone signals and to translate telephone signals destined to the core logic into network packets. This way, telephone data transmitted as network packets through a network are appropriately routed to the telephone and translated into standard telephone signals. Network packets which are destined to a network attached device other than the telephone are routed through the core logic according to standard network protocols.

The core logic according to alternative embodiments comprises a physical layer repeater, a datalink layer switch, or a higher layer router technology. Other data multiplexing techniques can also be utilized in the adaptor core logic.

The data processing resources which are coupled to the telephone port in some embodiments of the present invention comprise a medium access control unit for receiving network packets from the core logic, and for transmitting network packets to the core logic. Processing resources are coupled with the medium access control unit and perform analog-to-digital and digital-to-analog processing of telephone signals. Additional processing resources construct network packets according to higher layers of the protocol.

According to other aspects of the invention, the adaptor is included within a host computer. The first packet port on the adaptor is coupled to the host computer, either through a MAC unit coupled to the port, in the case that the core logic comprises a repeater or a switch, or through host bus interface logic, in case in which the core logic comprises a multiplexer for data from the network packets. The second packet port according to this aspect of the invention comprises a port to a local area network medium which is coupled to a network hub or other network logic at which packets carrying data from the first packet port and packets carrying digitized telephone signals from the telephone port can be combined onto the medium. The second packet port may comprise a repeater port or a full MAC unit depending on the particular implementation desired.

According to another embodiment of the invention, the adaptor is incorporated in a telephone. The telephone port is coupled to the telephone while the first and second packet ports are standard network connections. The first packet port is adapted for connection to a host computer while the second packet port is adapted for connection to the local area network medium which is coupled to the broader network.

One embodiment of the invention also includes an apparatus for providing electric power and telephone signals to the adaptor and the telephone across a transmission line across which the adaptor is coupled to a network device. A power and data coupler ("the coupler") is coupled to the transmission line, for example, at the network device. The transmission line is also adapted for transmission of a data signal. The data signal includes packetized telephone signal data for communications with the telephone. The coupler has a data input and a power input. Power from the power input is coupled with the data signal from the data input and the combined power supply current and data signal is coupled to the transmission line. The opposite end of the transmission line at the adaptor is coupled to a power and data decoupler ("the decoupler"). The decoupler has a power output and a data output. Both the data output and power output of the decoupler are coupled to the adaptor. The combined power and data signal is decoupled by the decoupler, and the data signal is supplied to the data output and to the adaptor core logic and the power is supplied to the power output. The telephone port on the adaptor receives the power from the power output and receives the telephone signal data from the adaptor core logic. The telephone port couples the power and the telephone signal data together on a transmission line to make a combined power and telephone signal, which can be used by the telephone.

These features of the invention will be apparent from the following description which should be read in light of the accompanying drawings.

BRIEF DESCRIPTION OF THE FIGURES

FIG. 1 provides a simplified view of a three port external adaptor, packet network attached telephone and computer, representing a first embodiment of the invention.

FIG. 2 provides a simplified view of a computer having an internal three port adaptor through which a telephone is attached to a data network, representing a second embodiment of the invention.

FIG. 3 provides a simplified view of a telephone having a three port adaptor, representing a third embodiment of the invention.

FIG. 4 is a simplified block diagram of the three port adaptor, including two packet network ports and a telephone port according to one embodiment of the present invention.

DETAILED DESCRIPTION

Figure 5:
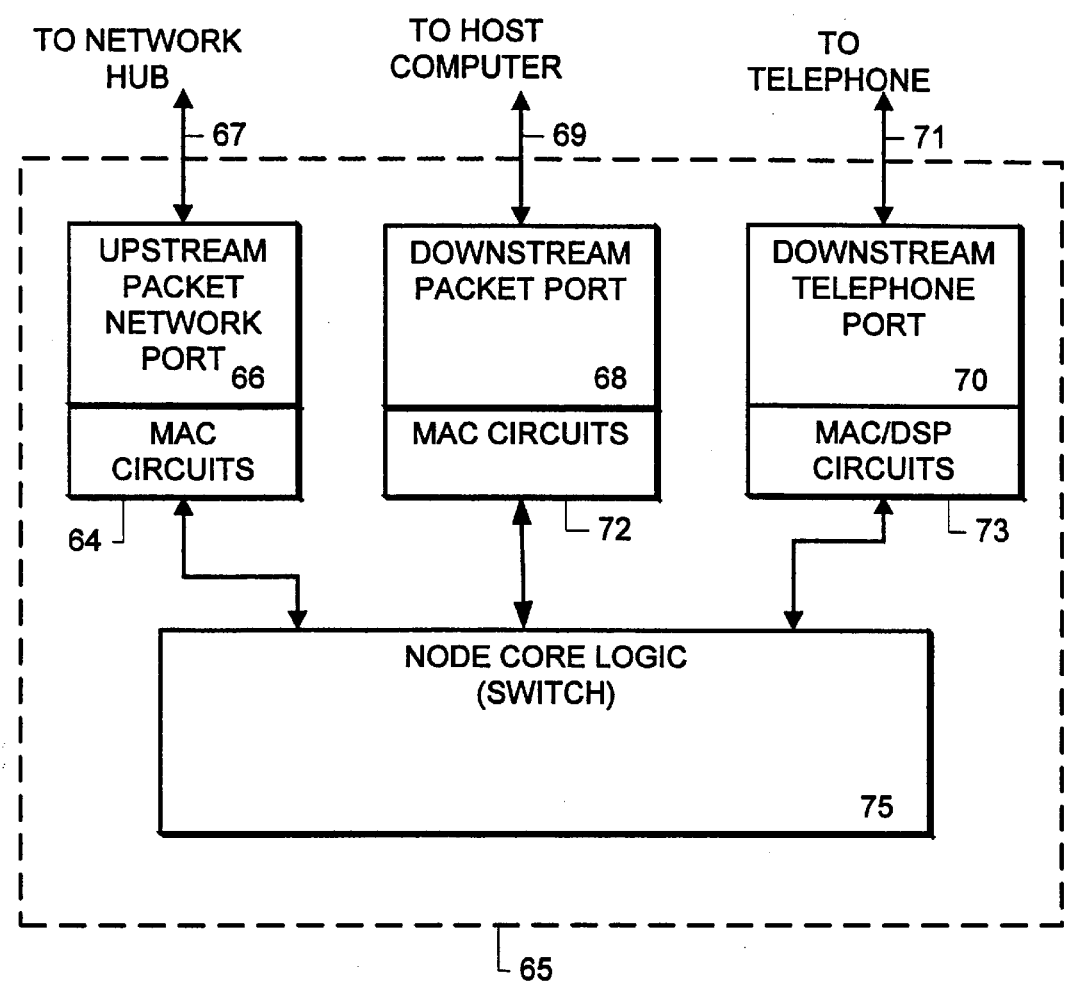
FIG. 5 is a simplified diagram of an alternative three port adaptor according to the present invention, in which the core logic comprises a layer 2 switch.

The invention and the various features and advantageous details thereof are explained more fully with reference to the nonlimiting embodiments that are illustrated in the accompanying drawings and detailed in the following description.

The invention involves combining voice communications with a packet network. Packet networks use a digital packet structure (e.g., 802.x) to format packets. Each packet includes a wrapper (e.g., header and trailer) and a payload. For example, a telephone is coupled to a fast Ethernet network device via an adaptor that is i) located internally within the telephone, ii) located internally within a computer or iii) located externally with regard to both the telephone and the computer. The invention can be broadly characterized as a voice communications device that is coupled to a packet network via a three-port adaptor.

Referring to the drawings, a detailed description of preferred embodiments of the invention is provided with respect to FIGS. 1–9. FIGS. 1–3 illustrate three examples of the invention.

Referring now to FIG. 1, a first embodiment of the invention is depicted. This first embodiment can be termed an external embodiment. A telephone 10 is coupled to an adaptor 20 via a telephone cable 30. A computer 40 is connected to the adaptor 20 via cable 50. The adaptor 20 is connected to a packet network device such as a network hub 60 via a network medium 11, such as an Ethernet segment. The network hub 60 can be any packet network device, such as, for example, a router, a switch or a bridge.

Referring now to FIG. 2, a second embodiment of the invention is depicted. This second embodiment can be termed a computer internal embodiment. In this second embodiment, the network medium 11, the telephone 10 and the cable 30 are the same as in the first embodiment, but the other components are different. A computer 17, includes a processor, an input/output device like a keyboard, a display and a data backbone structure for interconnecting the components. In this embodiment, the adaptor 18 is located inside the computer 17, and coupled to the data backbone structure of the computer, such as by an interface to a bus for peripheral devices (e.g. a PCI bus interface). The telephone 10 is connected to the adaptor 18 via telephone cable 30.

Still referring to FIG. 2, in this computer internal embodiment, the adaptor 18 can take the form of a circuit board which is plugged into an expansion slot of the computer 17. Such a circuit board could replace a conventional network adaptor. In such a circuit board, the downstream packet network connector comprises a bus interface or other connection to the backplane structure of the computer. In this way, the functions of a network adaptor would be provided by the circuit board having, for example, an upstream RJ45 for the Ethernet cable, a downstream RJ11 for the telephone cable and a bus connector. Alternatively, the adaptor is included directly on the motherboard, or otherwise included in the computer system. The signals from the computer 30, the packet network device 60 and the telephone 10 in FIG. 2 can be processed in the same way in which the signals from the corresponding components in FIG. 1 are processed.

FIG. 3 illustrates a third embodiment of the invention. The third embodiment can be termed a telephone internal embodiment. According to this embodiment, the local area network medium 11, a computer 40 and the cable 50 may be implemented as discussed above with regard to FIGS. 1 and 2. Other components of this embodiment are different in order to adapt to inclusion in the telephone. Telephone 12 is coupled to the adaptor 14 located inside the telephone chassis. The computer 40 is connected to the adaptor 14 via a cable 50.

Still referring to FIG. 3 in this telephone internal embodiment, the adaptor 14 can take the form of a circuit board which is plugged into a receptacle of the telephone 12. The circuit board, or other module, can be inserted into a multi-conductor slot in the telephone. In this way, a network adaptor is provided having a network connection upstream and a repeated switched, routed or otherwise multiplexed network connection to a computer. Alternatively, the adaptor can be embodied directly on the main circuit board of the telephone. The signals from the computer, the network hub and the telephone 12 in FIG. 3 can be processed in the same way in which the signals from the corresponding components in FIG. 1 are processed.

The structures for coupling the packet hub 60 to the adaptor (20, 18, 14) and the adaptor to the telephones and computers can be any medium capable of performing the function of transferring signals, including, by way of example twisted pair wires, a coaxial cable, an optical fiber, an infrared link or a RF wireless link.

A practical application of the invention that has value within the technological arts is combining voice and data in a local area network. Further, the invention has value in other network environments such as metropolitan area networking and wide area networking.

Figure 6:
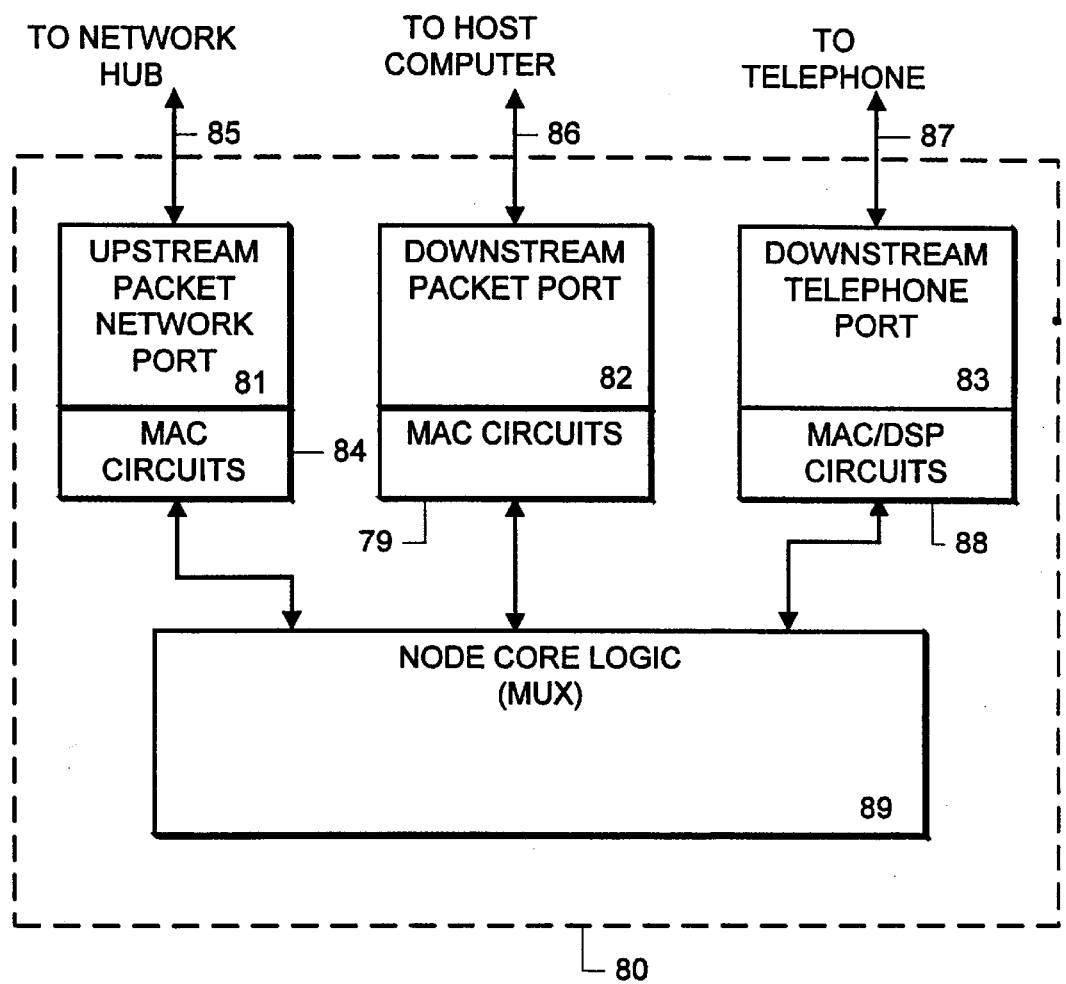
FIG. 6 illustrates an alternative embodiment of the three port adaptor of the present invention, which the core logic comprises multiplexing circuitry like a layer three router.

FIGS. 4–6 illustrate alternative implementations of the three port adaptor according to the present invention. A first example implementation is described with reference to FIG. 4. The adaptor includes an upstream packet network port 51, a downstream packet network port 52, and a downstream telephone port 53. The upstream packet network port 51 is coupled to a network medium 54 which also carries power. A power decoupler 55 is coupled to the medium 54 and generates power as indicated by arrow 56 for supply to the components of the adaptor 50, and to the telephone, as discussed in more detail below with reference to FIGS. 7–9.

The downstream packet network port 52 is coupled to a network medium 57 which is typically connected to a network interface card or medium access controller on a host computer. The downstream telephone port 53 is connected across a medium 58 to a standard telephone.

The packet network ports 51 and 52 are directly connected to node core logic 60, which in this example comprises a physical layer repeater for the network served by the network hub across medium 54. The downstream telephone port 53 is connected through a medium access control unit and digital signal processing MAC/DSP circuits 61 to the node core logic 60. The node core logic 60 distributes data packets which are received on any of the three ports to the other two ports according to standard repeater implementations. The upstream packet network port 51 and the downstream packet network port 52 thus behave as ports on standard repeaters. The MAC/DSP circuits 61 coupled to the downstream telephone port operate to translate telephone data in packet format received from the node core logic 60 into telephone data suitable for transmission through the telephone port 53 to the telephone. Also the MAC/DSP circuits 61 serve to translate analog or digital telephone signals received across the medium 58 from the telephone into packets suitable for transmission on the network medium 54 to the network hub, and to the host computer through the upstream packet network port 51 and the downstream packet network port 52.

The repeater in the node core logic 60 is based on any one of a number of commercially available repeater chips from manufacturers such as Advanced Micro Devices and National Semiconductor. The MAC/DSP circuits 61 perform coding and decoding operations and analog-to-digital and digital-to-analog conversion, suitable for translation between the packet network and the telephone medium 58 as known in the art.

The medium access controller MAC within the circuit 61 conforms to the network medium 54 in the preferred system. For example, the medium access controller may comprise any one of a number of standard MACs specified by the IEEE referred to as the 802.x standards. In one preferred implementation, the MAC supports 100 megabit Ethernet specified according to IEEE standard 802.3u, gigabit Ethernet, the FDDI standards, token ring standards or to any of a variety of other possible network media.

The analog signals from telephone on port 58 are digitized by the DSP circuits 61 and combined into packets suitable for transmission through the repeater in the node core logic 60 out onto the network. So the node core logic 60 can fan out packetized signals from the MAC/DSP circuit 61 to both the host computer on medium 57 and the network hub on medium 54. It is sufficient in some embodiments that the packets carrying telephone data are transmitted only on medium 54.

FIG. 5 illustrates another alternative implementation of the adaptor. In this case, the adaptor is given reference number 65. It includes an upstream packet network port 66 which is coupled to a medium 67, a downstream packet port 68 which is coupled to a medium 69, and a downstream telephone port 70 which is coupled to a telephone medium 71. The upstream packet port is coupled with a MAC 64. The downstream packet port 68 is coupled with a MAC 72. The downstream telephone port 70 is coupled to MAC/DSP circuits 73 like those described with respect to FIG. 4.

The node core logic 75 is coupled to each of the ports 66, 68 and 70 and serves to connect data from the medium 67 to the host computer on medium 69 or to the telephone on medium 70 as appropriate. Also the node core logic 75 serves to switch data from the telephone port 70 to the medium 67 to the network hub or to medium 69 to the host computer, and from the host computer to the medium 67 to the network hub or to the medium 71 for the telephone.

In this case, the node core logic 75 is implemented using switch control circuits which switch the packets on the three ports at the data link layer of the network. The MAC circuits 64, 72, 73 serve to translate the network packets into data suitable for processing in the switch core 75. The embodiment of FIG. 5 is suitable for including within a computer as a network interface card. Of course, the switch functionality in the node core logic 75 may also be implemented with repeater functionality as mentioned above with respect to FIG. 4.

FIG. 6 illustrates yet another alternative embodiment of an adaptor 80 according to the present invention. The adaptor 80 in FIG. 6 includes an upstream packet network port 81, a downstream packet port 82, and a downstream telephone port 83. The MAC circuits 84, 88 and 79 which translate packets into data suitable for routing to the host computer on medium 86 or to the telephone through the DSP circuits 88 which are coupled to the downstream telephone port 83. In this case, the node core logic 89 comprises multiplexing circuits such as a router operating for example at the network layer for routing decisions which receive packets after processing by the MAC circuits 84 and direct the packets as appropriate through MAC 79 on the port 82 or to the MAC/DSP circuits 88 coupled with the downstream telephone port 83. The MAC circuits 84 in this embodiment may be configured to accept packets having more than one MAC address corresponding to the ports 82 and 83. Alternatively, a single MAC address may be utilized, and the multiplexing decisions made based on higher layer processing within the protocol.

The following describes embodiments of the invention including phantom power circuits. In one embodiment, a coupling device couples packetized telephone signals and packetized computer data and transmits the combined data to the adaptor. The adaptor receives the data and helps separate the telephone data from the computer data. The adaptor then transmits the telephone data to a telephone. When the computer is powered down, such as during a power failure, the coupling device also couples a power signal to the combined data signal. The adaptor uses the power to power the telephone. Thus, a user can still use the telephone during a power failure.

The telephone voice data (also called bearer data) is formatted as Ethernet packets in one example. These telephone Ethernet packets are communicated with the other Ethernet packets in an Ethernet network. A network infrastructure device, such as a hub, receives the Ethernet packets from the Ethernet network, and forwards packets addressed to a particular personal computer or to a telephone to its associated adaptor.

Figure 7:
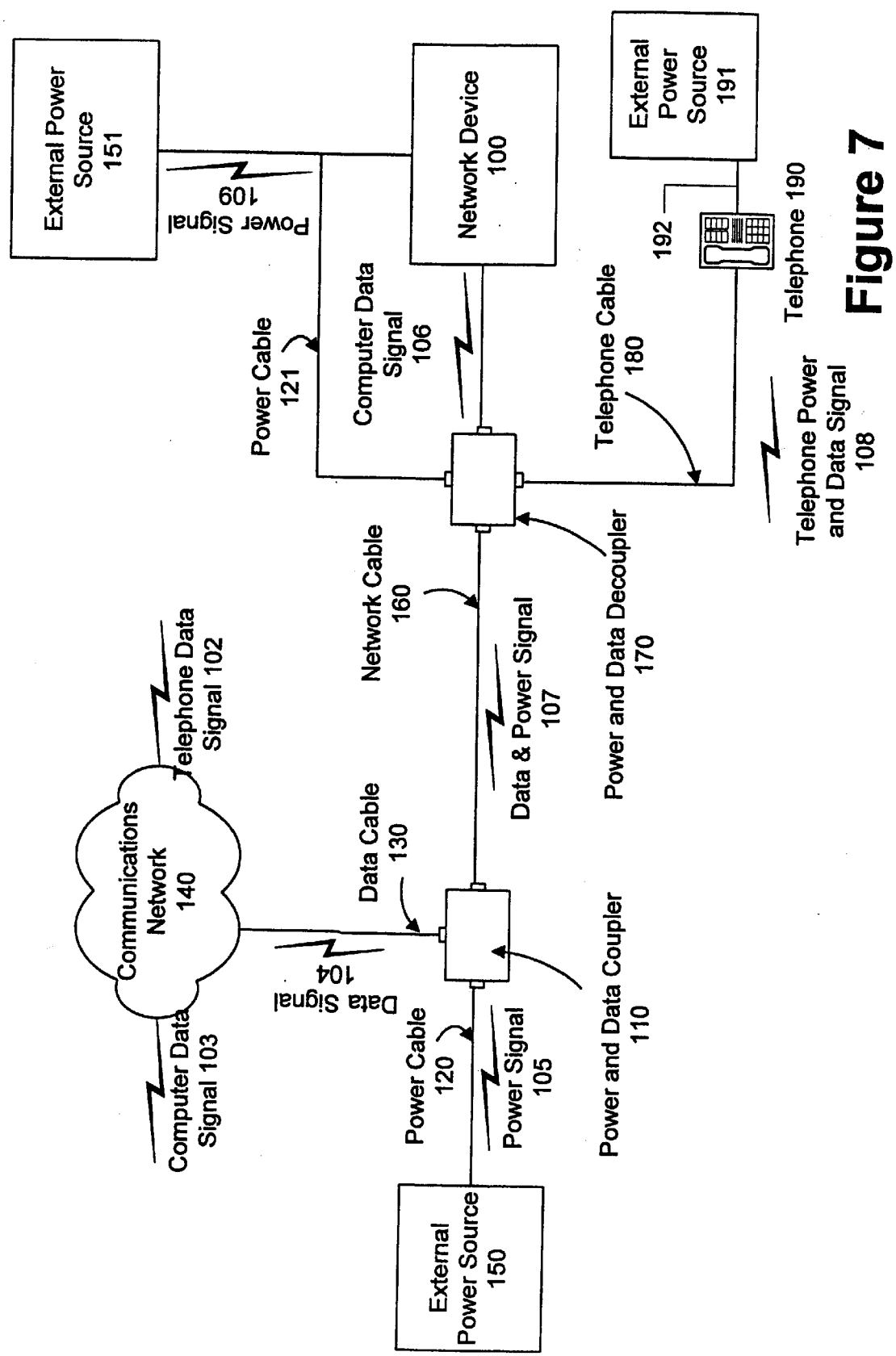
FIG. 7 provides an overview of an installation of a system according to the present invention including power transfer apparatus that supports both computer data and telephone data communications.

FIG. 7 shows the overall configuration of the one embodiment of the invention including a power transfer apparatus. The following lists the elements in FIG. 7 and then describes those elements.

FIG. 7 includes the following elements: an optional external power source 150; a power cable 120; a data cable 130; a power and data coupler 110; a network cable 160; an adaptor with a power and data decoupler 170; a network device 100; a telephone 190; an optional external power source 151; an optional external power source 191; and, a power cable 121.

The following describes the coupling of the elements of FIG. 7 relying external power source 150. The external power source 150 couples to the power and data coupler 110 via the power cable 120. The power cable 120 couples to the power and data coupler 110. The communications network 140 transmits both packetized computer data signals 103 and packetized telephone data signals 102. The communications network 140 couples to the data cable 130. The data cable 130 couples to the power and data coupler 110. The power and data coupler 110 also couples to the network cable 160. The network cable 160 couples to the power and data decoupler 170. The adaptor with the power and data decoupler 170 couples to the network device 100 and the telephone 190 from external power source 150.

Optionally, the external power source 151 rather than external power source 150 is relied on. In this case external power source 151 couples to the power cable 121. The power cable 121 couples to both the power and data decoupler 170 and to the network device 100. The power and data decoupler 170 supplies the telephone 190 from external power source 151.

In another option, the external power source 191 supplies telephone 190 across line 192. In this case, power from decoupler 110 is only needed if external power supply 191 is off.

The following describes the elements in greater detail and describes how the elements act together.

The external power source 150 provides a power signal 105 to the power and data coupler 110. Various embodiments of the invention use different external power sources 150: such as, a computer's power supply, a battery, or a wall outlet and adaptor. What is important, however, is that there is some source of power that can eventually be supplied to the network device 100 and telephone 190.

In one embodiment, the power cable 120 is a standard two wire power cable. Other embodiments use other power transfer apparatuses to provide power to the power and data coupler 110. For example, in one embodiment, the external power source 150 and the power and data coupler 110 are included in a hub.

The communications network 140 is representative of many different types of communications networks supported by various embodiments of the invention. Example communications networks 140 include FDDI, Ethernet (including ten Mbits/s, one hundred Mbits/s, and one Gigabits/s standards), ATM, token ring, and AppleTalk. However, what is important is that a data signal 104 is communicated between the communication network 140 and the network device 100. Also, the communications network 140 transmits both packetized computer data signals 103 and the packetized telephone data signals 102.

In one embodiment, the packetized telephone data signal 102 includes the bearer portion of a telephone signal. The bearer data is, for example, the packetized voice signal. In another embodiment, the packetized telephone data signal includes additional data supporting functions such as caller ID and voicemail access. The telephone data signal 102 is formatted and transmitted in Ethernet packets. Of course, other Local Area Network protocols may be used. These Ethernet packets are formatted the same way as the Ethernet packets for the computer data 103. Thus, in this embodiment, the data signal 104 comprises Ethernet packets.

The power and data coupler 110 will normally transmit the data signal 104 into 107. However, when the power signal 192 is not available to power the telephone 190 and when the external power source 151 is not operating, the power and data coupler 110 couples the power signal 105 with the data signal 104 to produce a combined power and data signal 107. The power and data coupler 110 is described in greater detail below. What is important is that there is some combined power and data signal 107 that can eventually be supplied to the telephone 190.

The network cable 160 includes one or more wires for transmitting the combined power and data signal 107. In one embodiment, the network cable 160 includes an CAT-3 or CAT-5 twisted pair cable.

The network device 100 represents a class of devices supported by various embodiments of the invention. For example, in one embodiment, the network device 100 includes a network computer. In another embodiment, the network device 100 includes a personal computer having a network interface card.

The telephone 190 is coupled to the adaptor with power and data decoupler 170 via the telephone cable 180. Optionally the power and data decoupler 170 may be part of the telephone 190. The telephone 190 is representative of any of a number of telephones. Various embodiments of the invention include plain old telephone service telephones, telephones with PBX features (such as are available from Nortel, Rolm, and Lucent Technology). In some embodiments, the telephones 190 communicate analog telephone signals over the telephone cable 180. In other embodiments, the telephone 190 communicates digital telephone signals over the telephone cable 180 (in these embodiments, the telephone 190 includes the digital to analog circuits for converting the users voice signal to and from a digital representation). The telephone cable 180, in one embodiment, is a four wire telephone cable. In other embodiments, the telephone cable 180 includes two wire, six wire, or more, telephone cable.

In the case using the external power source 151, a power signal 109 is supplied to the network device 100 and to the power and data decoupler 170 via the power cable 121. Various embodiments of the invention use different external power sources 151: such as, a computer's power supply, a battery, or a wall outlet and adaptor. What is important, however, is that there is some source of power that is supplied to the network device 100 and to the telephone 190 during normal operation. However, when the external power source 151 is not available, such as during a power outage or when the power cable 121 is not connected to the power and data decoupler 170, the power from the combined data and power signal 170 can be used to power the telephone 190.

In one alternative, external power source 191 is not used, and the adaptor with power and data decoupler 170 is responsible for supplying telephone data and power to the telephone 190, and computer data to the network device 100 and includes elements discussed above with respect to FIGS. 4–6. The adaptor 170 combines power, from some source, and the telephone data signals to produce the telephone power and data signal 108. In normal operation, the power and data decoupler 170 combines the power signal 109 with a telephone data signal extracted the data and power signal 107. (In this normal operation, the data and power signal 107 only includes data, not power.) When the power signal 109 is not available, the power and data decoupler 170 decouples the power signal 105 from the data signal 104. The power and data decoupler 170 then couples the power signal with the telephone data signal to produce the telephone power and data signal 108. By being able to continuously power the telephone allows the user to use the telephone, even when the external power source 151 fails.

The following describes the general operation of the elements of FIG. 7 using primarily external power source 151. A telephone data signal 102 is combined with a computer data signal 103 in the communications network 140. The data signal 104 is communicated, via the data cable 130, between the communications network 140 and the power and data coupler 110. When the external power source 151 is supplying the power signal 109, the power and data coupler 110 simply transmits the data signal onto the network cable 160 (in this situation, the power and data signal 107 does not include a power signal). The adaptor 170 receives network packets 107, the telephone signals 108 and the computer data packets 106. The computer data packets 106 are communicated with the network device 100. The power and data decoupler 170 couples the power signal 109 with the telephone data packets and transmits the combined telephone power and data packet signal 108 to the telephone 190. In another embodiment an external power source 191 is coupled to telephone 190. However, when the external power source 151 is not supplying the power signal 109 and the external power source 191 is not operating, the power and data coupler 110 couples the power signal 105 to the data signal 104. In this situation, the decoupler 170 decouples the power signal from the power and data signal 107. The adaptor 170 still extracts the telephone data signal 108 and computer data signal 106. The adaptor 170 then couples the extracted telephone data and the decoupled power signal to create the telephone power and data signal 108 for use by the phone 190. Note that even if the external power sources 191 or 151 are not working, the telephone 190 will continue to work.

Figure 8:
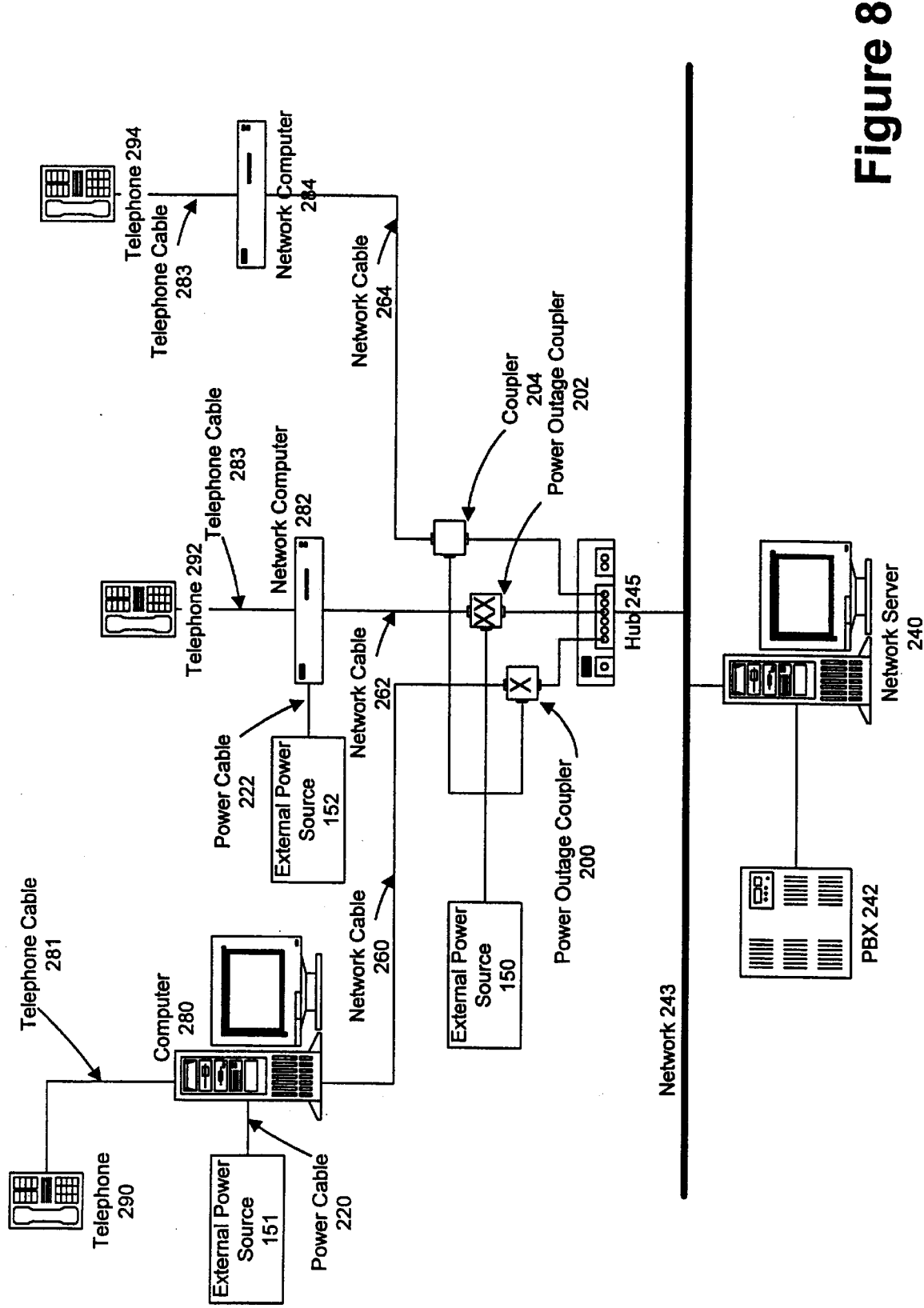
FIG. 8 is an overview of a power transfer apparatus for use with telephone equipment and network devices.

FIG. 8 is an overview of a power transfer apparatus for use with network devices including computers. The following lists the elements in FIG. 8 and then describes those elements.

FIG. 8 includes the following elements: a PBX 242; a network server 240; a network 243; a hub 245; an external power source 150; a power outage coupler 200; a power outage coupler 202; a coupler 204; a network cable 260; an external power source 151; a power cable 220; a computer 280 with an internal adaptor; a telephone 290; a network cable 262; an external power source 152; a power cable 222; a network computer 282 with an internal adaptor; a telephone 292; a telephone cable 281; a network cable 264; a network computer 284 with an internal adaptor; a telephone 294; and, a telephone cable 283.

The PBX 242, the network server 240 and the network 243, work together to provide both telephone data and network data to devices coupled to the network 243. The PBX 242, the network server 240 and the network 243 represent are example devices that provide the telephone functions, network server functions and network functions, respectively. In one embodiment, the PBX 242 includes a PBX having functions similar to a PBX from, for example, Nortel, Rolm, Lucent Technology, or Seimens. However, the PBX 242 has been modified to allow the network server 240 to send the PBX 242's telephone signal data 102 as Ethernet packets. Various embodiments of the invention include network servers 240 from, for example, Compaq, Hewlett-Packard, IBM, and Sun Microsystems. The network server 240 acts as a server for the network and includes circuitry and software for communicating with the PBX 242. In one embodiment, the network server supports Ethernet protocols for communicating data onto the network 243. The network 243 is illustrative of any of a number of computer networks including Ethernet, FDDI, AppleTalk, Token Ring, and ATM.

Note, in another embodiment, the PBX 242 is replaced with a PBX process running in the network server 240 and a gateway. A gateway provides the connection to the public switching network for the network 243. Vienna Systems, Corporation, of Kanata, Ontario, Canada, provides such a gateway.

The hub 245 couples to the network 243 and allows network devices to communicate with the network 243. Each device couples to a different port on the hub 245. For example, in FIG. 8, each coupler couples to a different port on the hub 245. In one embodiment, the hub 245 is not needed to supply the data signal. Therefore, in these embodiments of the invention, the data signal is supplied by a network computer, a router, a switch, and/or a bridge.

The external power source 150 provides power to the couplers. Each coupler, in this example, has a potentially different power requirements, therefore, different external power sources may be used. For example, to power the power outage coupler 200, an adaptor can be used. The adaptor steps down the available electrical power from 117 or 220 volts AC to an AC or DC voltage that is high enough to provide adequate voltage for the telephone 290. In one embodiment, the power adaptor supplies an output voltage of approximately negative forty-eight volts. Similar, example power adaptors are described in U.S. patent application Ser. No. 08/865,016, filed on May 29, 1997, entitled, "Power Transfer Apparatus for Concurrently Transmitting Data and Power Over Data Wires," having inventors David A. Fisher, Lawrence M. Burns, and Stephen Muther.

The couplers (power outage coupler 200, power outage coupler 202, and power outage coupler 204) provide similar coupling functions as those found in power and data coupler 110 (FIG. 7). Each coupler couples power and data signals for use by a telephone and some other computing device. The amount of power coupled, and when the power is coupled, is what varies between the various couplers. This will be described in greater detail below. Importantly, these couplers, and the present configuration, is merely illustrative. In some embodiments of the invention, each coupler has the same functionality.

Note that in other embodiments, the hub 245 includes the couplers and the external power source 150.

The following describes three example power and data coupling systems corresponding to coupler 200, coupler 202, and coupler 204 respectively. Each of these systems will now be described.

The following describes the system associated with the coupler 200. The coupler 200 is coupled to the computer 280 via the network cable 260. The external power source 151 couples to the computer 280 via the power cable 220. The telephone 290 couples to the computer 280. Comparing this system to FIG. 7, the computer 280 is the network device 100, and the computer 280 includes the power and data decoupler 170. When the external power source 151 fails, or otherwise becomes incapable of supplying power to the telephone 290, the power and outage coupler 200 is notified to couple power with the data signal from the hub 245. The power and data decoupler 170, in the computer 280, can then switch the source of power from the external power source 151 to the power from the network cable 260. This system is described in greater detail below with respect to FIG. 9.

The following describes the system associated with the coupler 202. The coupler 202 is coupled to the network computer 282. The external power source 152 couples to the network computer 282 via the power cable 222. The telephone 292 couples to the network computer 282 via the telephone cable 283. The network computer 282 includes a power and data decoupler similar to the one in the system of FIG. 7. The power outage coupler 202, and corresponding power and data decoupler, operates in a similar manner as the power outage coupler 200 system, except that the power outage coupler 202 supplies sufficient power to the decoupler to power both the telephone and the network computer 282. In one embodiment, separate power signals (e.g., twenty-four volts DC and minus forty-eight volts DC) are supplied on different pairs of wires within the network cable 262. The decoupler decouples both these power signals from any data signals. The different power signals are for the different power needs of the telephone 292 and the network computer 282. In another embodiment, only one power signal is transmitted, which is then modified by the decoupler for use by the network computer 282 and the telephone 292.

The following describes the system associated with the coupler 204. The coupler 204 is coupled to the network computer 284 via the network cable 264. The coupler 204 is similar to the power outage coupler 202, but the coupler 204 constantly supplies the power for the network computer 284 and the telephone 294.

In another embodiment, the telephone has its own external power supply, such as a battery or a wall adaptor. The coupler couples a power signal to the network cable 160 when the telephone's power supply fails.

Figure 9:
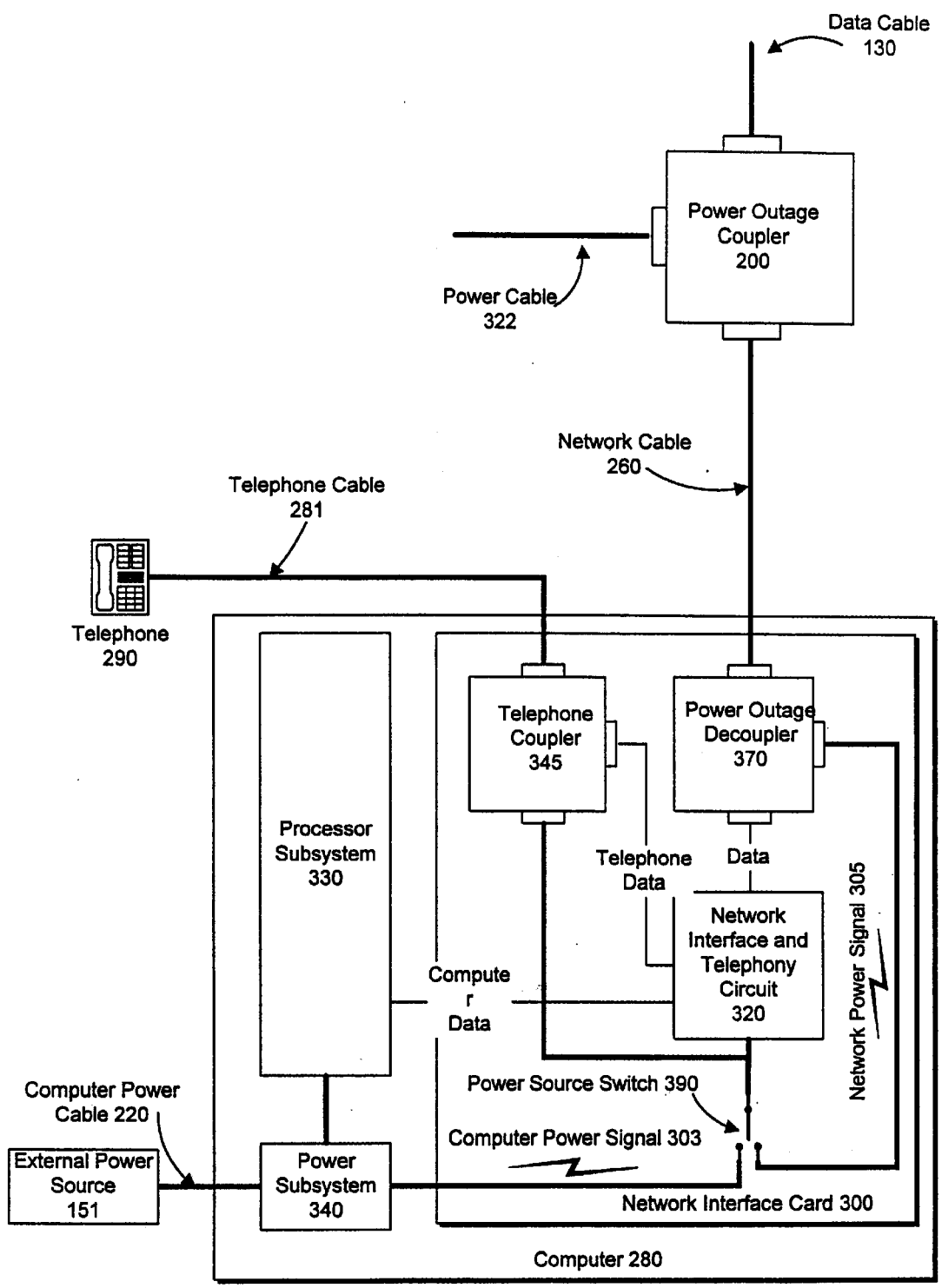
FIG. 9 is a schematic diagram of a power transfer apparatus for use with both computer data and telephone data implemented on a network interface card within a computer.

FIG. 9 is a schematic diagram of a power transfer apparatus that supports telephone features. This apparatus corresponds to the system associated with the coupler 200 in FIG. 8. The following first lists the elements in FIG. 9, then describes the elements' couplings, and then describes the elements' interactions.

FIG. 9 includes the power cable 322, the data cable 130, a power outage coupler 200, the network cable 260, the computer 280, the telephone 290, the telephone cable 281, the external power source 151, and the computer power cable 220. The computer 280 includes a network interface card (NIC) 300, a processor subsystem 330, and a power subsystem 340. The NIC 300 includes a power outage decoupler 370, an adaptor 320 providing network interface and telephony circuits, a power source switch 390, and a telephone coupler 345.

The elements of FIG. 9 are coupled as follows. The power cable 322, the data cable 130, and the network cable 260 are coupled to the power outage coupler 200 in the same way as shown in FIG. 7. The network cable 260 also couples to the input port of the power outage decoupler 370 on the NIC 300. The data output port of the decoupler 370 couples to the network interface and telephony circuit 320. The computer data port of the adaptor 320 couples to the processor subsystem 330. The power output port of the decoupler 370 couples to one of the two inputs of the power source switch 390. The other input of the power source switch 390 is coupled to the power subsystem 340. The power subsystem 340 also couples to the processor subsystem 330 and to the external power source 151 (via the computer power cable 220). The output of the power source switch 390 couples to the power input ports of the network interface and telephony circuit 320 and the telephone coupler 345. The telephone data port of the network interface and telephony circuit 320 is coupled to the data input port of the telephony coupler 345. The output of the telephone coupler 345 is coupled to the telephone cable 281. The telephone cable 281 couples to the telephone 290.

The following describes the elements and interactions between the elements of FIG. 9. The power subsystem 340 is illustrative of a PC power supply. The power subsystem 340 generally provides the power for the computer 280, including the processor subsystem and the NIC 300. The processor subsystem 330 represents those elements of the computer 280 that are not directly involved with the network interface functions of the computer 280. The NIC 300 includes the elements to perform three main functions. Each of these functions will now be described.

First, the NIC 300 supports network interface services, such as Ethernet communications, for the computer 280. In one embodiment, these services are supported using an Ethernet communications circuit in the network interface and telephony circuit 320. 3Com Corporation, of Santa Clara, Calif., supplies such Ethernet communication circuits.

Second, the NIC 300 also provides telephony services for the telephone 290. As the network interface and telephony circuits in adaptor 320 receive data from the power outage decoupler 370, the network interface and telephony circuits in adaptor 320 extract telephony related data and reformats it for use by the telephone. In one embodiment, this includes providing digital telephone data to the telephone coupler 345. The telephone coupler 345 then converts the digital telephone data to an analog signal and combines this analog signal with the power from the power source switch 390. In one embodiment, the telephone coupler 345 includes circuits similar to those found in a PBX, or in a telephone for use with a PBX. In another embodiment, the telephone 345 includes circuits similar to those found in a line card at a central switching office for coupling power and data together.

Third, the NIC 300 switches between the available power supplies. The power source switch 390 will attempt to use the power from the subsystem 340. However, if a power outage prevents the power subsystem 340 from supplying sufficient power to power the telephone, the power supply switch 390 will switch to using the network power signal 305. In one embodiment, the network interface card will signal the power outage coupler 200 to begin supplying power because of the insufficient computer power signal 303.

Note that the examples described above are merely illustrative. Other embodiments of the invention include different configurations and elements. For example, in one embodiment of the invention, some of the circuits in the power source switch 390 are shared by the power outage decoupler 370 and the telephone coupler 345. In another embodiment, the power outage coupler 200, the power outage decoupler 370, and/or the telephone coupler 345 include electrical isolation circuitry. Examples of such circuitry are described in U.S. patent application Ser. No. 08/865,016, filed on May 29, 1997, entitled, "Power Transfer Apparatus for Concurrently Transmitting Data and Power Over Data Wires," having inventors David A. Fisher, Lawrence M. Burns, and Stephen Muther. In another embodiment, the power coupled by the coupler 200 is an AC power signal, while in another embodiment, the power coupled by the coupler 200 is a DC power signal.

The preceding has described multiple embodiments of the invention. In one embodiment, power, computer data and telephone data are combined and transmitted to a computer. The computer uses the power to power a telephone coupled with the computer. Because the power and data are combined, the telephone can be powered even when the computer has been powered off.

While the foregoing invention has been described in referenced to some of its embodiments, it should be understood that various modifications and alterations will occur to those practiced in the art. Such modifications and alterations are intended to fall within the scope of the appended claims.

What is claimed is:

1. An apparatus for interconnecting a telephone, a first data network and a second data network, comprising:

a first data network port;

a telephone port;

a second data network port;

core logic coupled to the first and second data network ports, and to the telephone port which retransmits, without data compression, network packets received on one of the first data network port, second data network port, and the telephone port, to the other two ports; and data processing resources coupled to the telephone port and the core logic which translate network packets destined to the telephone port to telephone signals, and telephone signals destined to the core logic to network packets.

2. The apparatus of claim 1, wherein the core logic comprises a physical layer repeater.

3. The apparatus of claim 1, wherein the core logic comprises a data link layer switch.

4. The apparatus of claim 1, wherein the core logic comprises network layer router.

5. The apparatus of claim 1, wherein the first data network port comprises an interface to a host data processing system.

6. The apparatus of claim 1, wherein the second data network port comprises a medium access control unit for access to a network medium.

7. The apparatus of claim 1, wherein the first data network port comprises an interface to a host data processing system; and the second data network port comprises a medium access control unit for access to a network medium.

8. The apparatus of claim 1, wherein the first data network port comprises a medium access control unit for access to a first network medium; and the second data network port comprises a medium access control unit for access to a second network medium.

9. The apparatus of claim 1, wherein the core logic comprises a repeater, and the data processing resources in the telephone port comprise a medium access control unit for access to a network medium through the core logic on at least one of the first data network port and the second data network port.

10. The apparatus of claim 1, including resources for extracting DC power from the second network data port, and supplying DC power to the telephone port.

11. A computer comprising:

a data processing system, including a processor, an input/output device, a display and a data backbone structure;

an adaptor coupled to the data backbone structure, the adaptor comprising:

a host interface, connected to the data backbone structure;

a telephone port;

a data network port;

core logic coupled to the host interface, the data network port, and to the telephone port which retransmits, without data compression, network packets received on one of the host interface, the data network port, and the telephone port, to the other two ports; and data processing resources coupled to the telephone port and the core logic which translate network packets destined to the telephone port to telephone signals, and telephone signals destined to the hub core logic to network packets.

12. The computer of claim 11, wherein the core logic comprises a physical layer repeater.

13. The computer of claim 11, wherein the core logic comprises a data link layer switch.

14. The computer of claim 11, wherein the core logic comprises network layer router.

15. The computer of claim 11, wherein the core logic comprises a repeater, and the data processing resources in the telephone port comprise a medium access control unit for access to a network medium through the core logic on at least one of the first data network port and the second data network port.

16. The computer of claim 11, wherein the data network port comprises a medium access control unit for access to a network medium.

17. The computer of claim 11, including resources for extracting DC power from the network data port, and supplying DC power to the telephone port.

18. A telephone comprising:
 a telephone device, having a telephone signal input/output, and telephone signal processing resources;
 an adaptor coupled to the telephone signal input/output, the adaptor comprising:
  a first data network port;
  a telephone port connected to the telephone signal input/output;
  a second data network port;
  core logic coupled to the first data network port, second data network port and to the telephone port which retransmits, without data compression, network packets received on one of the first data network port, second data network port, and the telephone port, to the other two ports; and
  data processing resources coupled to the telephone port and the core logic which translate network packets destined to the telephone port to telephone signals, and telephone signals destined to the hub core logic to network packets.

19. The telephone of claim 18, wherein the core logic comprises a physical layer repeater.

20. The telephone of claim 18, wherein the core logic comprises a data link layer switch.

21. The telephone of claim 18, wherein the core logic comprises network layer router.

22. The telephone of claim 18, wherein the core logic comprises a repeater, and the data processing resources in the telephone port comprise a medium access control unit for access to a network medium through the core logic on at least one of the first data network port and the second data network port.

23. The telephone of claim 18, wherein the data network port comprises a medium access control unit for access to a network medium.

24. The telephone of claim 18, including resources for extracting DC power from the second network data port, and supplying DC power to the telephone signal processing resources.

* * * * *